United States Patent
Cheng et al.

(10) Patent No.: US 7,336,638 B2
(45) Date of Patent: *Feb. 26, 2008

(54) METHOD AND APPARATUS FOR UPLINK SYNCHRONIZATION MAINTENANCE WITH P2P COMMUNICATION IN WIRELESS COMMUNICATION NETWORKS

(75) Inventors: Jiang Cheng, Shanghai (CN); Li Sun, Shanghai (CN)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 10/556,613

(22) PCT Filed: Apr. 16, 2004

(86) PCT No.: PCT/IB2004/050468

§ 371 (c)(1),
(2), (4) Date: Nov. 15, 2005

(87) PCT Pub. No.: WO2004/102833

PCT Pub. Date: Nov. 25, 2004

(65) Prior Publication Data

US 2006/0258383 A1    Nov. 16, 2006

(30) Foreign Application Priority Data

May 19, 2003    (CN) ................................ 03 1 23738

(51) Int. Cl.
*H04Q 7/24* (2006.01)

(52) U.S. Cl. ...................... 370/338; 370/278; 370/280; 370/311; 370/330; 370/335; 370/337; 370/342; 455/517; 455/522; 455/509

(58) Field of Classification Search ................ 455/436, 455/414.1, 11.1, 502, 522, 415, 416, 428, 455/439, 442, 455, 509, 511, 514, 515, 516, 455/518, 519, 528, 526, 517; 370/278, 311, 370/328, 330, 331, 335, 336, 338, 342, 412, 370/280, 337
See application file for complete search history.

(56) References Cited

U.S. PATENT DOCUMENTS 5,636,243 A    6/1997    Tanaka (Continued)

FOREIGN PATENT DOCUMENTS

WO    WO0200237714 A1    5/2002

(Continued)

OTHER PUBLICATIONS

3rd Generation Partnership Project: Technical Specification Group Radio Access Network: Synchronisation in UTRAN Stage 2, Release 5, 3GPP TS 25.402 V5.1.0, Jun. 2002, pp. 1-46, XP002261398.

(Continued)

*Primary Examiner*—Matthew D. Anderson
*Assistant Examiner*—Shaima Q. Aminzay (57) ABSTRACT

A method for maintaining uplink synchronization in P2P (Peer to Peer) communication, performed by a user equipment in wireless communication systems, comprising: negotiating with a wireless communication network system about the schedule and parameters for controlling the uplink synchronization of the user equipment by the procedure of establishing P2P direct link; transmitting testing signals to the network system via a customized uplink channel according to the negotiated parameters; receiving the control information transmitted via a customized downlink channel from the network system according to the negotiated schedule; and maintaining uplink synchronization of the user equipment in P2P communication according to the control information. Uplink synchronization can be realized through the customized channel, so the present invention can overcome the problem of overload brought by implementing uplink synchronization through the downlink common control channel and system performance degradation caused by increasing the transmitting power of the user equipment to transmit P2P signals.

22 Claims, 3 Drawing Sheets

U.S. PATENT DOCUMENTS

| | | |
|---|---|---|
| 5,913,171 A | 6/1999 | Solonen et al. |
| 6,028,853 A * | 2/2000 | Haartsen ............... 370/338 |
| 6,047,178 A * | 4/2000 | Frlan ..................... 455/423 |
| 6,094,575 A * | 7/2000 | Anderson et al. ....... 455/422.1 |
| 6,389,032 B1 * | 5/2002 | Cohen ..................... 370/412 |
| 6,415,146 B1 * | 7/2002 | Capece .................... 455/517 |
| 6,496,694 B1 * | 12/2002 | Menon et al. ........... 455/426.2 |
| 6,807,165 B2 * | 10/2004 | Belcea .................... 370/347 |
| 7,039,027 B2 * | 5/2006 | Bridgelall ................ 370/329 |
| 7,079,509 B2 * | 7/2006 | Belcea .................... 370/330 |
| 7,082,108 B2 * | 7/2006 | Hwang et al. ........... 370/311 |
| 7,088,688 B2 * | 8/2006 | Kim et al. ............... 370/280 |
| 7,133,386 B2 * | 11/2006 | Holur et al. ............. 370/331 |
| 2006/0153105 A1 * | 7/2006 | Jia et al. .................. 370/278 |
| 2006/0229092 A1 * | 10/2006 | Jia et al. .................. 455/517 |
| 2006/0245398 A1 * | 11/2006 | Li et al. ................... 370/335 |
| 2006/0258382 A1 * | 11/2006 | Zhang et al. ............ 455/501 |
| 2006/0258383 A1 * | 11/2006 | Jiang et al. .............. 455/502 |

FOREIGN PATENT DOCUMENTS

| | | |
|---|---|---|
| WO | 2004077919 A2 | 9/2004 |
| WO | 2004077920 A2 | 9/2004 |
| WO | WO2004080103 A1 | 9/2004 |

OTHER PUBLICATIONS

ISR, Written Opinion of the International Searching Authority, PCT/IB2004/050468.

* cited by examiner

METHOD AND APPARATUS FOR UPLINK SYNCHRONIZATION MAINTENANCE WITH P2P COMMUNICATION IN WIRELESS COMMUNICATION NETWORKS

FIELD OF THE INVENTION

The present invention relates to a method and apparatus with P2P communication in wireless communication networks, and more particularly, to a method—and apparatus for uplink synchronization maintenance with P2P communication in wireless communication networks.

BACKGROUND ART OF THE INVENTION

Figure 1:
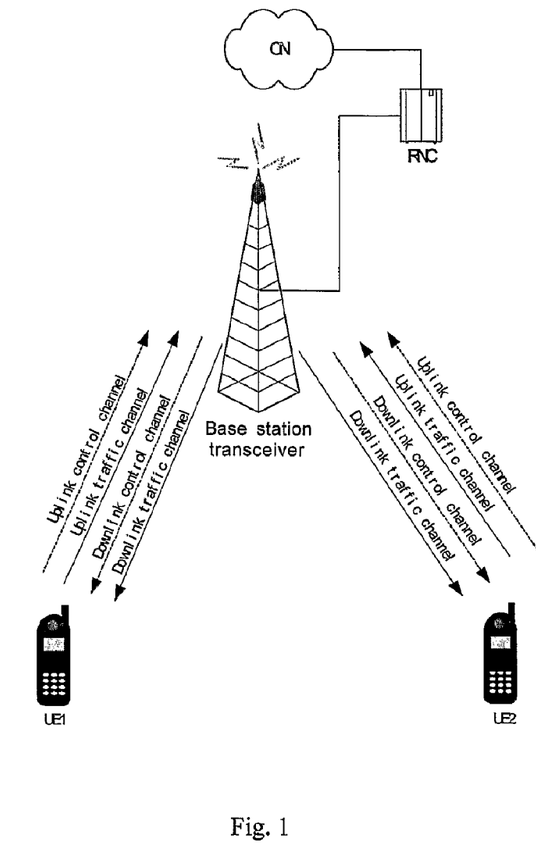
FIG. 1 is a schematic diagram illustrating conventional UP-UTRAN-DOWN communication mode.

In conventional cellular mobile communication systems, a UE (user equipment) has to communicate with the other UE only through the relaying of base stations regardless of the distance between the two UEs. FIG. 1 illustrates the conventional communication mode, where UE1 and UE2 interact through the UTRAN consisting of the base station transceiver (namely Node B) and the Radio Resource controller (RNC), and this communication mode Is also called UP-UTRAN-DOWN mode. However, in some cases when the distance between two UEs who are camping in the same cell is very close, it can be a more reasonable way for them to communicate directly, rather than through the relaying of base stations. This method is the so-called peer-to-peer communication, abbr. as P2P.

Figure 2:
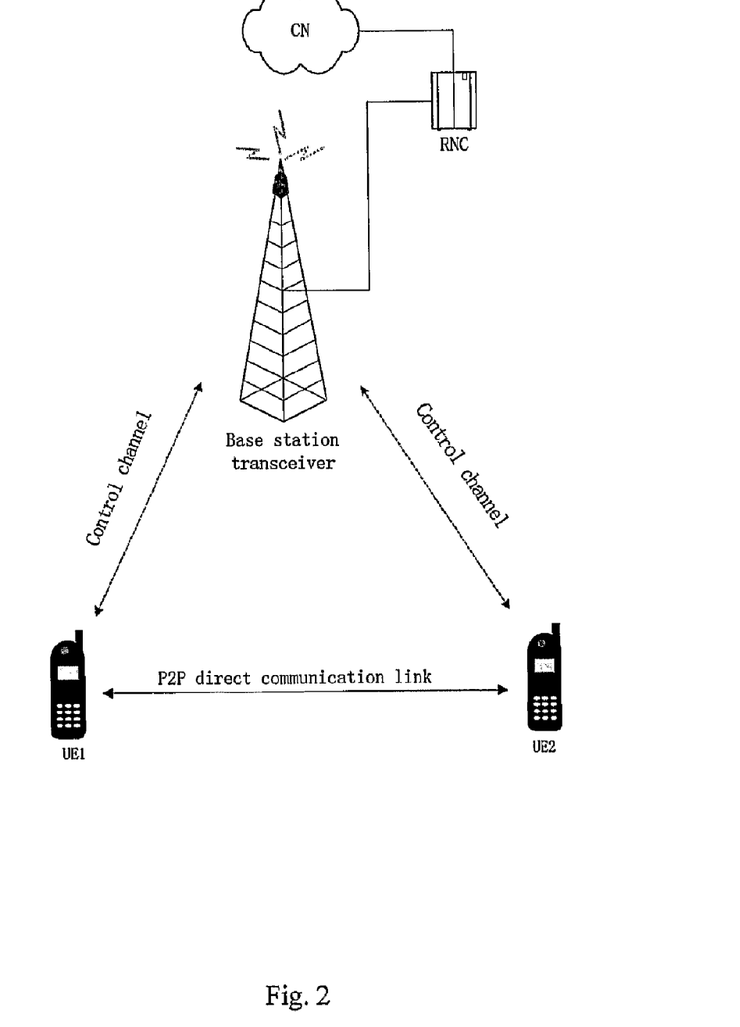
FIG. 2 is a schematic diagram illustrating the P2P communication mode in accordance with the present invention.

FIG. 2 illustrates a P2P communication mode, as FIG. 2 shown, the dashed line represents signaling link, the solid line for data link and the arrowhead for direction of information flow. Only signaling link exists between the UTRAN and the UE, while only data link exists between the two communicating UEs. Assume that only resource for maintaining basic communication is needed. A direct link is taken as one unit of radio resource (with fixed frequency, timeslot and spreading code), it can be easily drawn that P2P communication mode only needs two units of radio resource to maintain basic communication. If additional signaling cost for management is ignored, P2P communication can save about 50% radio resource than conventional communication mode. Meanwhile, the UTRAN still holds control over P2P communication, especially over how to use radio resources, so that network operators can easily charge for the radio resources used by P2P communication.

A method and apparatus for establishing P2P communication in wireless communication networks, as described in the patent application entitled "A Method and Apparatus for Establishing P2P Communication in Wireless Communication Networks", filed by KONINKLIJKE PHILIPS ELECTRONICS N.V. on Mar. 7, 2003, application Ser. No. 03119892.9, is suitable to any TDD CDMA communication system including TD-SCDMA systems, and incorporated herein as reference.

A method and apparatus for radio link establishment and maintenance with P2P communication in wireless communication networks, as described in the patent application entitled "A Method and Apparatus for Radio Link Establishment and Maintenance with P2P Communication in Wireless Communication Networks", filed by KONINKLIJKE PHILIPS ELECTRONICS N.V. on Mar. 7, 2003, application Ser. No. 03119895.3, is suitable to any TDD CDMA communication system including TD-SCDMA systems, and incorporated herein by reference.

After establishing uplink synchronization with the UTRAN through the same random access procedure as existing TD-SCDMA systems, the UE can establish a P2P direct link with the other UE, in accordance with the method and apparatus as described in the application document whose application Ser. No. is 03119892.9, i.e.: allocate relevant dedicated resource for two P2P UEs. Then, direct link between the two UEs can be established and maintained in accordance with the method and apparatus as described in the application whose application Ser. No. is 03119895.3, so that the two UEs can receive and transmit P2P signals in the allocated timeslots respectively, and thus P2P communication between two UEs can be implemented.

However, when P2P communication mode is applied in TDD wireless communication systems, if a P2P UE shares the same uplink timeslot as other UEs employing UP-UTRAN-DOWN mode, it may potentially impair uplink synchronization and thus deteriorate the system performance. Specifically, when any UE working in P2P communication mode moves, the distance between the UE and the UTRAN will change, which means the UE establishing uplink synchronization with the UTRAN via random access procedure in cell search procedure after powering on, is likely to lose synchronization with the UTRAN. At this time, corresponding methods are needed to keep the UE in synchronization with the UTRAN. Otherwise, the UTRAN can overhear information on the P2P link between the two UEs during P2P communication process. In this way, if it can't be guaranteed that the P2P signals from the two UEs arrive at the UTRAN at the same time, the spreading code demodulated at the UTRAN won't be orthogonal, thus the system performance is deteriorated.

But P2P communication mode changes the UP-UTRAN-DOWN communication mode in conventional TD-SCDMA systems, i.e.: in conventional TD-SCDMA systems, the UTRAN is involved in any ongoing communication as information source or destination or relayer/forwarder, thus it can monitor and control the UE's uplink signal transmitting time through a specific traffic burst structure, so as to maintain uplink synchronization between the UE and the UTRAN in connect mode. While during P2P communication, the UE has no dedicated traffic channel linked with the UTRAN, so it can only overhear information between two P2P UEs, which means that the UTRAN can't maintain uplink synchronization with conventional mode by adjusting the uplink synchronization TA (time advance) with a specific traffic burst structure even if it can overhear and estimate the communicating UE's synchronization shift information. Therefore, for communication systems like TD-SCDMA systems that have a strict requirement for uplink synchronization, how to maintain uplink synchronization between a moving UE and the UTRAN, will be a great challenge.

An method and apparatus for maintaining uplink synchronization between the moving UE and the UTRAN to be controlled by sending synchronization shift information via the paging control channel in the downlink common control channel between the UE and the UTRAN, is described in the patent application entitled "A Method and Apparatus for Uplink Synchronization Maintenance with P2P Communication in Wireless Communication Networks", filed by KONINKLIJKE PHILIPS ELECTRONICS N.V. on Mar. 7, 2003, application Ser. No. 03119895.3, and incorporated herein as reference.

In the method and apparatus for uplink synchronization maintenance as described in the application, with no direct dedicated channel between the UTRAN and the UEs, the PCCH (paging control channel) in existing downlink common control channel is utilized to send synchronization shift information to the UEs, thus radio resource is saved. But the method and apparatus brings two new problems: first, when the UTRAN can't overhear information transferred on the P2P direct communication link, it will require the UEs to increase transmission power for P2P signals, which violates the transmission power requirement for P2P communication; second, sending synchronization shift information by using downlink common control channel, will potentially cause overload on downlink common control channel. Detailed description will be given below to the two problems:

First, the method and apparatus for uplink maintenance as described in the application document with application Ser. No. as 03119894.5, estimates the synchronization shift information of two UEs, according to the UTRAN's overheard signal on the direct link between the two P2P UEs. Then, the synchronization shift information obtained through estimation is sent to the two UEs via downlink common control channel between the UTRAN and the UEs. However, when failing to overhear information transferred on P2P direct communication link, the URAN has to send poll message to the UE to increase its power to transmit P2P signals till it can overhear information transferred over P2P direct communication link. This means transmission power of the P2P communicating UEs is expected to transmit signals to each other with transmission power high enough to reach the UTRAN, otherwise, the UTRAN may fail to overhear signals on P2P direct link and therefore fail to maintain uplink synchronization for each UE. On the other side, In accordance with the purpose of P2P communication establishment, P2P link generally is established between two UEs who are very close to each other, and in order to satisfy the same quality for the same services, the P2P communicating UEs are expected to transmit P2P signals to each other with much lower transmission power than that between the UE s and the UTRAN. With lower transmission power, P2P communication can benefit the system with reduced system interference and saved battery consumption, and therefore improve system capacity. As described above, the UE's transmission power may be increased for the UTRAN to overhear signals on the P2P link, which imposes contradicts with increasing the system performance and capacity by using lower transmission.

Second, in accordance with the method and apparatus for uplink synchronization maintenance as described in the application whose application Ser. No. is 03119894.5, when overhearing signals transferred on the direct link between two P2P communicating UEs, the UTRAN can get the synchronization shift information by estimating the midamble in the traffic burst structure. Then, the synchronization shift information is sent to the P2P communicating UEs via PCH on downlink control channel, to adjust the UEs' TA for transmitting P2P signals, and thus the UE and the UTRAN can be kept synchronized. According to TD-SCDMA protocol standard, we know a specific PCH is shared by several UEs and the associated PCH for each UE is Identified by the calculation result of its IMSI (International Mobile Station Identification, only the last three digitals is used in this case), DRX (Discontinuous Reception) cycle and the number of common control channels. Each UE has a different IMSI of its own, while DRX cycle and the number of common control channel are determined by the network system configuration. For each UE sharing the same PCH, all calculation results for identifying each UE's PCH and calculated according to the IMSI, DRX cycle and the number of common control channels, will fall in the same PCH block in paging cycle. If there are many UEs camping in the same cell and some of them happen to work in P2P communication mode and share the same PCH, the synchronization maintenance will avoidably add great overload to the PCH, especially when the UTRAN fails to overhear the ongoing signals on the P2P links in order to keep uplink synchronization of those UEs. The overloaded PCH may potentially block normal paging from outside of the cell and impair the system performance in the mobile communication system.

SUMMARY OF THE INVENTION

An object of the present invention is to provide a method and apparatus for uplink synchronization maintenance with P2P communication in wireless communication systems. By employing customized channels between the UTRAN and the UEs, the method and apparatus can control the P2P communicating UEs to maintain uplink synchronization, thus effectively resolve the above problems like overload of PCH caused by controlling the P2P communicating UEs to maintain uplink synchronization via common control channels and system performance degradation caused by increasing the UE's transmission power when the UTRAN can't overhear P2P link signals.

To achieve the object of the present invention, a method is proposed for uplink synchronization with P2P (Peer to Peer) communication, performed by the UE in a wireless communication system, comprising: (a) negotiating with the wireless communication network system about the schedule and parameters for controlling uplink synchronization for the UE, during P2P direct link establishment; (b) transmitting testing signals to the network system via a customized uplink channel according to the negotiated parameters, with the TA and transmission power obtained through random access procedure; (c) receiving the control information transmitted via a customized downlink channel from the network system according to the negotiated schedule; (c) maintaining uplink synchronization for the UE in P2P communication according to the control information. Wherein the customized uplink channel and downlink channel are customized by the networks system for the UE between the UE and the network system.

An uplink synchronization maintenance method for a P2P UE to be executed by the network system in a wireless communication system in the present invention, comprising: (i) customizing an uplink channel and a downlink channel between the network system and the UE for the UE; (ii) negotiating with the UE about the schedule and parameters for controlling uplink synchronization; (iii) receiving testing signals from the UE via the customized uplink channel, according to the negotiated parameters; (iv) estimating the control information for uplink synchronization for the UE, according to the received signals; and (v) transmitting the control information to the UE via said customized downlink channel according to the negotiated schedule, so as to control the UE to maintain uplink synchronization with the network system during P2P communication procedure.

DETAILED DESCRIPTION OF THE INVENTION

Regarding to the method for a UE to maintain uplink synchronization with the UTRAN during P2P communication provided in the present invention, its essence lies in: maintaining customized channels between each UE and the UTRAN to control each UE's uplink synchronization when two UEs are performing P2P communication, wherein the customized uplink channel is for the UTRAN to estimate synchronization shift information and the customized downlink for the UTRAN to send the adjusted synchronization shift information to the corresponding UE.

The channels to be customized between the UTRAN and the P2P UEs may be DCH (Dedicated channel) or USCH/DSCH (Uplink/Downlink shared channel), or any other traffic channel or control channel satisfying the requirement. During P2P direct link establishment procedure, these customized channels are allocated to corresponding UEs. During uplink synchronization maintenance procedure in P2P communication, the customized channels can also be adjusted. Different from existing dedicated channels and USCH/DSCH, these customized channels can be used to control the P2P UEs to maintain uplink synchronization, according to specific UE requirement with specific subframe and occupancy interval. The uplink synchronization maintenance method provided in the present invention, reserves customized channels between the UTRAN and the UEs, but it has obvious difference from the uplink synchronization maintenance method in conventional TD-SCDMA systems, which can be characterize in: (1) traffic information is not transferred on the customized channels between the UTRAN and the corresponding UE, so traffic information transferred on the P2P direct link won't produce direct influence upon these customized channels. But in conventional TD-SCDMA systems, dedicated channels between the UTRAN and the UEs are for transferring traffic information; (2) a UE in P2P communication mode can send N continuous traffic bursts to the UTRAN, so as to estimate the uplink synchronization shift information, i.e.: the UTRAN can estimate the synchronization shift information according to N continuous traffic bursts, but in the uplink synchronization control method in conventional TD-SCDMA systems, the UTRAN estimates the synchronization shift information according to a traffic burst transmitted by the UE; (3) these channels between the UTRAN and corresponding UEs are customized according to different UE requirement, which means the corresponding UEs can share these channels with other UEs and the corresponding UEs only occupy these channels intermittently and regularly when needed, so the UTRAN can estimate uplink synchronization intermittently and regularly according to the negotiated schedule. But in conventional TD-SCDMA systems, the UTRAN estimates the timing information continuously by evaluating the channel impulse response of each midamble in the same timeslot used by users in each sub-frame.

Figure 3:
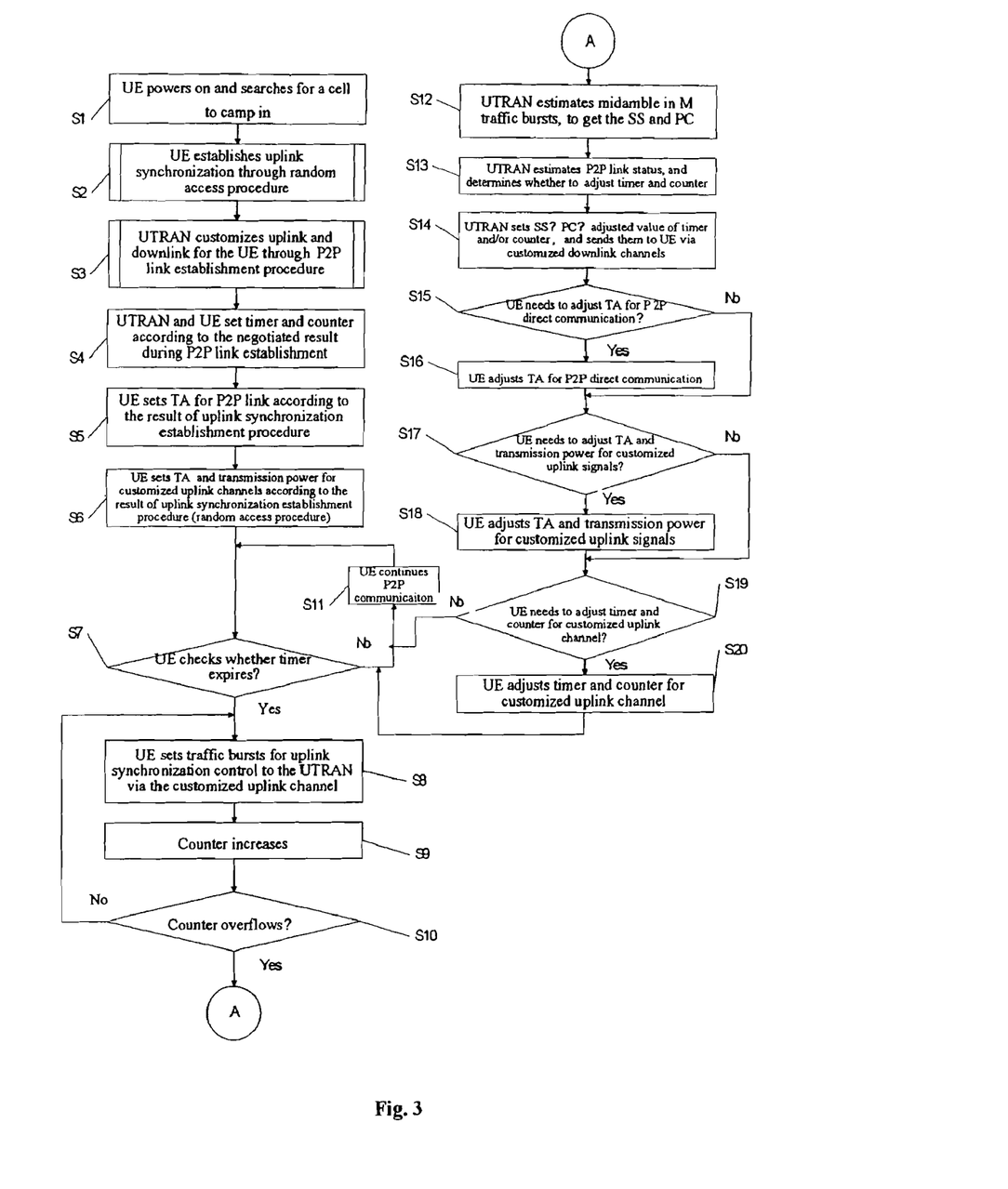
FIG. 3 illustrates the chart flow for the method for the uplink synchronization maintenance with P2P communication in TD-SCDMA systems in accordance with the present invention.

A detailed description below will go to the uplink synchronization maintenance method as proposed in the present invention via the customized channels between the UTRAN and the UEs, taking TD-SCDMA system as example, in conjunction with FIG. 3.

First, the same as the cell search phase in conventional communication, the UE searches for a cell to camp in after powering on (step S1). The UE establishes uplink synchronization with the UTRAN through random access procedure (step S2). Afterwards, the UTRAN customizes uplink and downlink channels for the UE when the UE establishes P2P link with the other UE (step S3), wherein the customized uplink and downlink channels can be the DCH or USCH/DSCH, and these customized channels shouldn't conflict with the radio resource used for P2P direct communication.

During P2P link establishment, the UE and the UTRAN negotiate the schedule and parameters for uplink synchronization control, that is: to determine the interval to execute uplink synchronization control and how many continuous bursts to be used in uplink synchronization estimation. According to the negotiated result, the UE and the UTRAN set TimerD (for determining the interval to execute uplink synchronization) and counterV (for determining the number of continuous bursts) respectively (step S4). During uplink synchronization maintenance procedure, the value of the timer and the counter can be adjusted according to P2P link status, for instance, according to the changing communication environment, distance between the UE and the other UE who are performing P2P communication, locations of the two UEs, their transmission power and specific requirements from the UTRAN or the two UEs (e.g. the UTRAN may want to get the status information of all P2P direct links). Generally speaking, when two P2P UEs get closer, the needed transmission power will be lower and thus their potential impact upon the UTRAN as uplink interference will be smaller, and hence, the interval of Timer is expected to increase and the number of continuous bursts is expected to decrease. In opposite situations such as the distance is getting further or radio link is getting worse, the needed transmission power increases accordingly. At this time, the potential impact upon the UTRAN, i.e. uplink interference, increases correspondingly, thus the interval of Timer is expected to decrease and the number of continuous bursts to be set by the counter Is expected to increase accordingly.

After the timer and the counter for uplink synchronization control are set according to the negotiated parameters, the P2P UE sets its TA for transmitting P2P signals via the direct traffic channel according to the synchronization adjustment acquired during random access procedure in which uplink synchronization is established (step S5). Then, the UE begins to communicate directly with the other UE via the P2P communication link.

While setting its TA for transmitting P2P signals, the UE sets its TA and transmission power to transmit testing signals for controlling uplink synchronization via the above customized uplink channel to the UTRAN, according to the synchronization adjustment and power control information obtained when establishing uplink synchronization with the UTRAN during random access procedure (step S6).

During P2P communication, the UE checks whether it is time to send signals for uplink synchronization (step S7). If the timer doesn't expire, the UE go on with direct communication (step S11). If the timer expires, the UE sends traffic bursts to the UTRAN continuously via the customized uplink channel (step S8), and at the same time the counter begins to count (step S9). The UE judges whether the traffic bursts sent reach the predefined value of the counter (step S10). If not reached, the UE keeps sending traffic bursts (step S8); if reached, the UE stops sending traffic bursts to the UTRAN. It should be pointed here that no data are contained in the traffic bursts sent by the UE to the UTRAN, but P2P link status information can be included if needed. When sending N traffic bursts to the UTRAN, the UE continues P2P direct communication. After sending N traffic bursts, the UE waits for the downlink control information from the UTRAN via the customized downlink channel, according to the negotiated schedule.

According to the predefined schedule, the UTRAN receives and records the N expected continuous traffic bursts transferred from the UE via the customized uplink channel. If the UTRAN receives M of the N traffic bursts (1<M<=N), the UTRAN estimates and obtains the uplink synchronization shift information SS and power control information PC, by evaluating M continuous channel impulse responses of each midamble used in the customized uplink channel (step S12). If P2P link status information is included in the traffic bursts sent via the customized uplink channel, the UE determines whether the counter and timer need to be adjusted according to evaluating the P2P link status information (step S13). The UTRAN sets the UE's synchronization shift information SS, power control information PC, the adjusted values of the timer and/or the counter, and then sends the estimated synchronization shift information SS, power control information PC, the adjusted values of the timer and/or the counter to the UE, in the next available downlink timeslot via the customized downlink channel (step S14). If the UTRAN fails to receive any traffic burst from the UE in the above step S12, it only sends power control command and doesn't send synchronization shift information and the adjusted values of the timer and/or counter to the UE in step S14, so that the UE can increase its expected transmission power the next time it sends N traffic bursts via the customized uplink channel.

According to the negotiated schedule, the UE receives the control information from the UTRAN via the customized downlink channel, wherein the control information includes the above synchronization shift information SS, power control information PC, the adjusted values of the counter and/or the timer. Then, the UE determines whether the TA for transmitting signals needs to be adjusted, according to the synchronization shift information SS (step S15). Wherein, If information SS is included in the control information, that is, the UE is out of synchronization with the UTRAN, the UE adjusts its transmission time in P2P direct link in step of ±k/8 chips (step S16), wherein the default value of k (from 1 to 8) is to be determined through negotiation during P2P link establishment and the value of k can be adjusted during the call. If information SS is not included in the control information, that is, the UE maintains synchronization with the UTRAN or the UTRAN can't evaluate the synchronization shift, the UE won't adjust its transmission time for P2P signals. Meanwhile, the UE determines whether to adjust its transmission time and transmission power to be used for transmitting signals on the customized uplink channel next time (step S17). If needed, the UE adjusts its transmission time and transmission power to be used for transmitting signals on the customized uplink channel next time, according to the received synchronization shift information SS and power control information PC as above (step S18). Moreover, the UE further determines whether to adjust the value of timer and/or the counter (step S19). If needed, the UE adjusts the interval to send signals to the UTRAN and the number of continuous traffic bursts next time via the customized uplink channel, according to the adjusted value of the timer and/or the counter in the received control information (step S20). After making the above adjustments, the UE continues P2P communication, and iterates the procedures in the above steps from S7 to S20 during P2P communication.

The above method for uplink synchronization maintenance with P2P communication in wireless communication networks in accordance with the present invention, can be implemented in computer software, or in corresponding hardware, or in combination of software and hardware. In an embodiment of the present invention, the hardware structures of existing mobile terminals and the UTRAN, remain unchanged, while the above steps from S1 to S20 can all be implemented in software modules.

BENEFICIAL RESULTS OF THE INVENTION

As described above, compared with the method for controlling uplink synchronization by utilizing downlink common control channels, the method for uplink synchronization provided in the present invention Is obviously different. The difference lies in that there exist customized uplink channel for estimating synchronization shift information and downlink channel for sending the synchronization shift information between the UE and the UTRAN, so the UTRAN needn't overhear traffic signals transferred on the P2P link in the method of the present invention. Meanwhile, the present invention realizes uplink synchronization control through customized channels between the UE and the UTRAN, so problems like overload of downlink common control channel and system performance degradation caused by increasing the UE's transmission power, can be overcome. Thus, signals from different UEs can arrive at the UTRAN at the same time during P2P communication, which maintains the orthogonal integrity of modulated spreading code of uplink signals and cancels the interference of the P2P direct link to the wireless systems.

Compared with the method for controlling uplink synchronization by utilizing downlink common control channels, the method for uplink synchronization provided in the present invention occupies a little more radio resource, but UEs only use these customized channels intermittently and the resource cost added by these customized channels can be shared by P2P dynamic channel allocation procedure, P2P soft switching procedure, power control procedure and etc, which is necessary for P2P communication systems to mange radio resource. Therefore, the method provided in the present invention can still save radio resource than existing communication systems.

It is to be understood by those skilled in the art that the method for uplink synchronization maintenance with P2P communication as proposed in this invention, is also applicable to other TDD mode, TDD SCDMA and advanced wireless communication systems that have certain requirement for uplink synchronization.

It is also to be understood by those skilled in the art that the method for uplink synchronization maintenance as disclosed in this invention can be modified considerably without departing from the spirit and scope of the invention as defined by the appended claims.

What is claimed is:

1. A method for maintaining uplink synchronization in P2P (Peer to Peer) communication performed by user equipment (UE) in wireless communication systems, comprising:
   (a) negotiating with a UTRAN (Universal mobile telecommunications system Terrestrial Radio Access Network) of a wireless communication network system to determine a schedule and parameters for controlling the uplink synchronization for the user equipment, during a procedure of establishing a P2P direct link between the UE and another UE;
   (b) transmitting testing signals from the UE to the UTRAN of the network system via a customized uplink channel according to the negotiated schedule and parameters, wherein the negotiated schedule and parameters include at least (i) an interval corresponding to an intermittent and regular interval for sending testing signals from the UE to the UTRAN for executing unlink synchronization estimation and control, and (ii) a number corresponding to a number of continuous traffic bursts to be included in the testing signals and used for the unlink synchronization estimation and control;

(c) receiving control information transmitted via a customized downlink channel from the UTRAN of the network system according to the negotiated schedule; and (d) maintaining uplink synchronization for the user equipment with the UTRAN during P2P communication of the UE with the another UE, according to the control information; wherein the customized uplink channel and downlink channel are channels between the user equipment and the UTRAN of the network system allotted to the user equipment by the UTRAN of the network system and used intermittently to control and maintain unlink synchronization of the UE with the UTRAN during the P2P communication of the UE with the another UE.

2. The method according to claim 1, wherein step (d) includes:

adjusting a timing advance (TA) for the UE transmitting P2P signals during the P2P communication and for the UE transmitting said testing signals to the UTRAN via the customized unlink channel, so as to control the user equipment to maintain uplink synchronization with the UTRAN of the network system during P2P communication of the UE with the another UE, according to said control information.

3. The method according to claim 1, wherein step (d) includes:

adjusting a transmission power of the user equipment to transmit said testing signals via the customized unlink channel according to said control information.

4. The method according to claim 1, wherein step (d) includes:

adjusting said negotiated parameters at the UE in response to control information, wherein said negotiated parameters at least include one of the following two parameters:

(i) the interval in which to transmit said testing signals from the UE to the UTRAN of the network system; and (ii) the number of traffic bursts continuously transmitted to the UTRAN of the network system in the testing signals for use in unlink synchronization estimation for controlling uplink synchronization.

5. The method according to claim 4, wherein step (b) includes:

transmitting said testing signals to the UTRAN of the network system via said customized uplink channel when said negotiated interval is overrun, according to said negotiated interval.

6. The method according to claim 4, wherein step (b) includes:

continuously transmitting said number of traffic bursts to the UTRAN of the network system, according to the negotiated number of continuous traffic bursts used in uplink synchronization control.

7. The method according to claim 1, wherein said customized uplink channel and downlink channel are one kind of a dedicated channel (DCH) and an uplink/downlink shared channel.

8. A method for user equipment (UE) in P2P (peer-to-peer) communication to maintain uplink synchronization in wireless communication systems, performed by a UTRAN (Universal mobile telecommunications system Terrestrial Radio Access Network) of a wireless communication network system, comprising:

(i) customizing an uplink channel and a downlink channel between the UTRAN of the network system and the user equipment for the user equipment;

(ii) negotiating between the UTRAN and the user equipment about a schedule and parameters for controlling the uplink synchronization for the UE;

(iii) receiving testing signals at the UTRAN from the user equipment via the customized uplink channel, according to said negotiated schedule and parameters;

(iv) estimating control information at the UTRAN for uplink synchronization for the user equipment, according to the received testing signals; and (v) transmitting the control information from the UTRAN to the user equipment via said customized downlink channel, so that the user equipment can maintain uplink synchronization with the UTRAN during P2P communication with another UE.

9. The method according to claim 8, wherein said negotiated parameters include at least one of the following two parameters:

an interval in which the UE transmits and the UTRAN of the network system receives said testing signals from said UE via the customized uplink channel so as to control uplink synchronization; and a number of continuous traffic bursts to be used by the UTRAN of the network system in the estimating of control information for uplink synchronization control.

10. The method according to claim 9, wherein step (iii) includes:

receiving said testing signals transmitted via said customized uplink channel from the user equipment when the negotiated interval is overrun, according to said negotiated interval.

11. The method according to claim 9, wherein step (iii) includes:

receiving said number of continuous traffic bursts from the user equipment via said customized uplink channel.

12. The method according to claim 8, wherein said control information at least includes synchronization shift information of the user equipment, power control information used to transmit said testing signals from the UE to the UTRAN of the network system, and one of the negotiated parameters after adjustment.

13. The method according to claim 12, wherein the negotiated parameters after adjustment, included in said control information, are determined by evaluating the state of the P2P link between the user equipment and the other user equipment, according to said testing signals.

14. The method according to claim 13, wherein said state of P2P link at least includes one of a change of distance between the user equipment and the other user equipment and a change of transmitting power with which the user equipment and the other user equipment transmit P2P signals.

15. The method according to claim 8, wherein said customized uplink channel and downlink channel are one kind of a dedicated channel (DCH) and an uplink/downlink shared channel (USCH/DSCH).

16. A user equipment (UE) for maintaining uplink synchronization in P2P (Peer to Peer) communication in wireless communication systems, comprising:

a parameter negotiating means, for negotiating with a UTRAN (Universal mobile telecommunications system Terrestrial Radio Access Network) of a wireless communication network system about a schedule and parameters for controlling uplink synchronization of the user equipment (UE) during a procedure of establishing a P2P direct link with another UE;

a transmitting means, for transmitting testing signals to the UTRAN of the network system via a customized uplink channel according to the negotiated schedule and parameters;

a receiving means, for receiving control information transmitted via a customized downlink channel from the UTRAN of the network system, according to the negotiated schedule; and a synchronization maintaining means, for maintaining uplink synchronization with the UTRAN during P2P communication of the user equipment with the other UE;

wherein the customized uplink channel and downlink channel are channels between the user equipment and the UTRAN of the network system customized by the UTRAN of the network system for the UE, wherein the customized unlink channel and down link channel are used intermittently to control and maintain unlink synchronization of the UE with the UTRAN during the P2P communication of the UE with the other UE.

17. The user equipment according to claim 16, wherein said synchronization maintaining means includes:

an adjusting means, for adjusting a timing advance (TA) for the UE transmitting P2P signals to the other UE and for the UE transmitting testing signals to the UTRAN, and a transmitting power with which to transmit testing signals and said negotiated parameters, so as to maintain uplink synchronization between the user equipment and the UTRAN of the network system during P2P communication of the UE with the other UE, according to said control information.

18. The user equipment according to claim 16, wherein said negotiated parameters at least include one of the following two parameters:

an interval in which to transmit said testing signals from the UE to the UTRAN of the network system; and a number of continuous traffic bursts included in said testing signals transmitted to the UTRAN of the network system for use in unlink synchronization estimation for controlling uplink synchronization.

19. A UTRAN (Universal mobile telecommunications system Terrestrial Radio Access Network) of a wireless communication network system in wireless communication systems, capable of performing a method to maintain uplink synchronization for a user equipment (UE) in P2P (peer-to-peer) communication with another UE, comprising:

a customizing means, for customizing an uplink channel and a downlink channel for the user equipment between the UTRAN of the network system and the user equipment;

a negotiating means, for negotiating with the user equipment about a schedule and parameters for controlling the uplink synchronization of the user equipment;

a receiving means, for receiving testing signals transmitted via said customized uplink channel from the user equipment, according to said negotiated schedule and parameters;

an estimating means, for estimating control information for uplink synchronization of the user equipment, according to said received testing signals; and a transmitting means, for transmitting the control information to the user equipment, wherein responsive to the control information the user equipment operates to maintain uplink synchronization with the UTRAN during P2P communication of the UE with another UE, according to the negotiated schedule.

20. The UTRAN of the network system according to claim 19, wherein said negotiated parameters include at least one of the following two parameters:

an interval in which the UTRAN of the network system receives said testing signals from said customized uplink channel so as to estimate an uplink synchronization control; and a number of continuous traffic bursts used by the UTRAN of the network system in estimating the uplink synchronization control.

21. The UTRAN of the network system according to claim 19, wherein said control information at least includes (i) synchronization shift information of the user equipment, (ii) power control information used by the UE to transmit said testing signals to the UTRAN of the network system, and (iii) one of the negotiated parameters after adjustment.

22. The UTRAN of the network system according to claim 21, further comprising an evaluating means, for determining whether to adjust said negotiated parameters by evaluating the state of the P2P link between the user equipment and the other user equipment, according to said testing signals.

* * * * *